United States Patent
Deng

(10) Patent No.: US 10,784,003 B2
(45) Date of Patent: *Sep. 22, 2020

(54) CONTAINMENT COOLING APPARATUS

(71) Applicant: Sichuan Xingzhi Zhihui Intellectual Property Operation Co., Ltd., Chengdu, Sichuan (CN)

(72) Inventor: Liping Deng, Sichuan (CN)

(73) Assignee: Sichuan Xingzhi Zhihui Intellectual Property Operation Co., Ltd., Chengdu (CN)

( * ) Notice: Subject to any disclaimer, the term of this patent is extended or adjusted under 35 U.S.C. 154(b) by 438 days.

This patent is subject to a terminal disclaimer.

(21) Appl. No.: 15/821,929

(22) Filed: Nov. 24, 2017

(65) Prior Publication Data
US 2018/0358135 A1 Dec. 13, 2018

(30) Foreign Application Priority Data
Jun. 9, 2017 (CN) .......................... 2017 1 0432639

(51) Int. Cl.
*G21C 15/18* (2006.01)
*G21C 9/012* (2006.01)
*G21C 15/12* (2006.01)

(52) U.S. Cl.
CPC ............. *G21C 15/18* (2013.01); *G21C 9/012* (2013.01); *G21C 15/12* (2013.01); *Y02E 30/40* (2013.01)

(58) Field of Classification Search
CPC .................................. G21C 15/18; G21C 15/12
See application file for complete search history.

(56) References Cited

U.S. PATENT DOCUMENTS

| | | | | |
|---|---|---|---|---|
| 4,753,771 A * | 6/1988 | Conway | ................. | G21C 15/18 376/282 |
| 5,049,353 A * | 9/1991 | Conway | ................. | G21C 15/18 376/293 |
| 2009/0323884 A1* | 12/2009 | Sato | ........................ | G21C 13/00 376/283 |
| 2013/0272474 A1* | 10/2013 | Conway | ............... | G21C 13/022 376/299 |
| 2017/0162282 A1* | 6/2017 | Lin | ....................... | G21C 15/182 |

FOREIGN PATENT DOCUMENTS

| | | |
|---|---|---|
| CN | 103489490 A | 1/2014 |
| CN | 203839055 U | 9/2014 |

OTHER PUBLICATIONS

Bajorek, S. "AP1000 Passive Safety Systems" NRC Presentation, Aug. 2007, available at https://www.nrc.gov/docs/ML1523/ML15230A043.pdf. (Year: 2007).*

* cited by examiner

*Primary Examiner* — Sharon M Davis

(57) ABSTRACT

A containment cooling apparatus includes a cooling water tank disposed above a containment; a spray header connected to the cooling water tank via a first communicating pipe, wherein the spray header is disposed on an outside of the containment for spraying cooling water to an outer wall of the containment; a bell shaped shield covering the containment, wherein the cooling water tank is disposed on a top portion of the shield; a space formed between an inner wall of the shield and the outer wall of the containment, wherein the spray header is disposed in the space; an exhaust hole disposed on the top portion of the shield; and a water separator disposed in the exhaust hole and/or the space. The containment cooling apparatus has higher utilization of coolant.

5 Claims, 1 Drawing Sheet

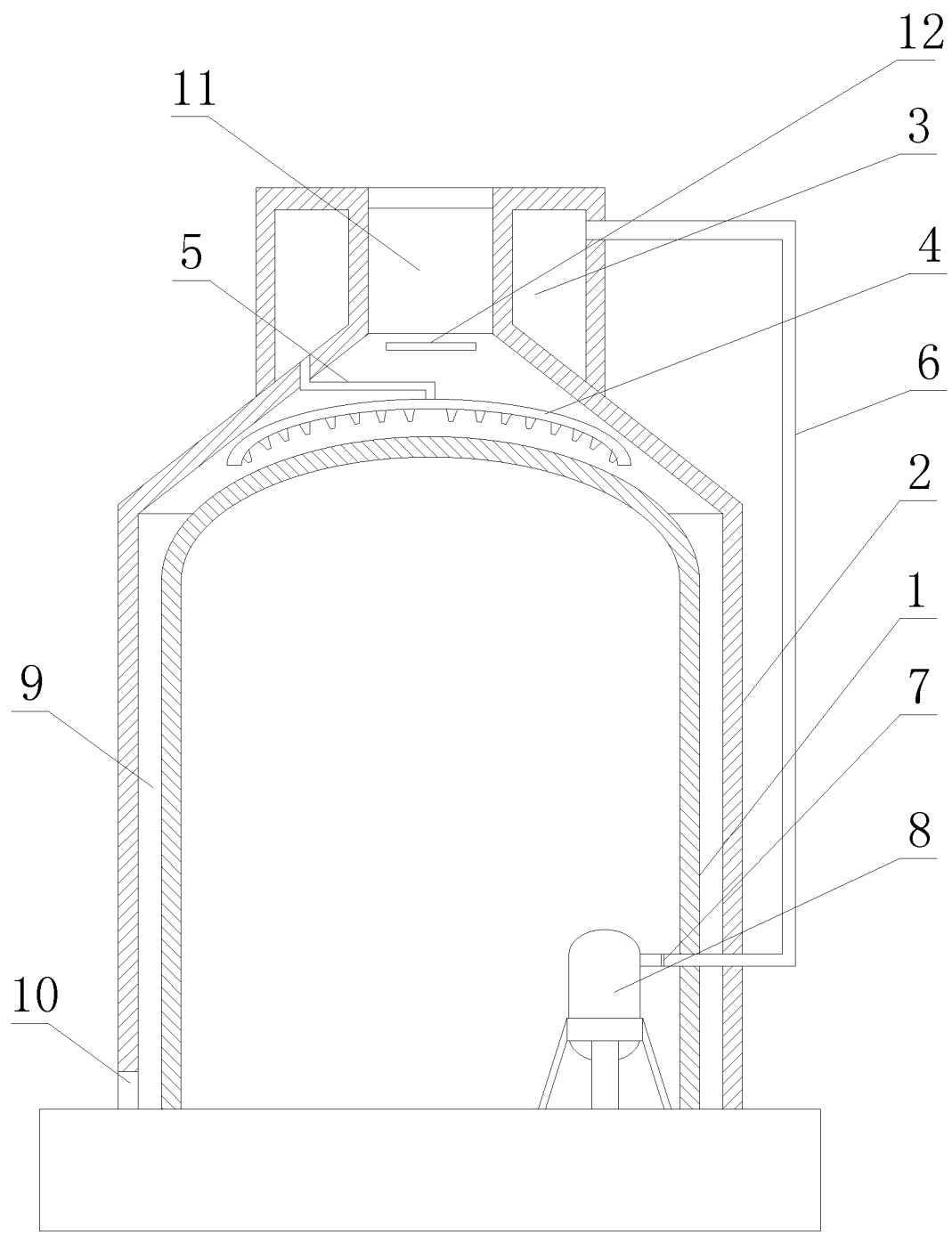

US 10,784,003 B2

CONTAINMENT COOLING APPARATUS

CROSS-REFERENCE TO RELATED APPLICATION

The present invention claims priority to pending Chinese Patent Application No. 201710432639.0, filed on Jun. 9, 2017, and incorporated herein by reference.

FIELD OF THE INVENTION

The present invention relates to nuclear reactor apparatus technology, and more particularly to a containment cooling apparatus.

BACKGROUND OF THE INVENTION

A nuclear reactor is capable of starting, controlling and maintaining nuclear fission or fusion chain reactions. In the nuclear reactor, the reaction rate could be controlled precisely so as to release energy slowly for people consumption. The nuclear reactor comprises various uses, and the most important one is replacing other fuel to generate heat as steam electric power or driving power of apparatus, for example, aircraft carrier. As important energy source, any possible faults occurred during operation of the nuclear reactor cannot be overlooked. A containment spray system is a protective apparatus to lower pressure and temperature inside the containment in the event that the primary circuit has an accident.

In the prior art, passive containment spray system is a protective apparatus that can operate during a power outage, guaranteeing safety of the nuclear reactor. Therefore further optimizing the structural design of the passive containment spray system to improve utilization of coolant in passive condition is a main research direction for the people skilled in the art.

BRIEF SUMMARY OF THE INVENTION

The present invention provides a containment cooling apparatus aiming to have higher utilization of coolant.

According to one embodiment of the present invention, the containment cooling apparatus includes a cooling water tank disposed above a containment; a spray header connected to the cooling water tank via a first communicating pipe, wherein the spray header is disposed on an outside of the containment for spraying cooling water to an outer wall of the containment; a bell shaped shield covering the containment, wherein the cooling water tank is disposed on a top portion of the shield; a space formed between an inner wall of the shield and the outer wall of the containment, wherein the spray header is disposed in the space; an exhaust hole disposed on the top portion of the shield; and a water separator disposed in the exhaust hole and/or the space.

Specifically, the cooling water tank stores the cooling water used as the containment coolant. The cooling water tank disposed above the containment allows the cooling water to flow into the spray header via the first communicating pipe under gravity, and then spray from the spray header to realize passive cooling of the containment. In such embodiment, the spray header is disposed in the space, resulting in sufficient contact between the cooling water and the outer wall of the containment, facilitating cooling effect on the containment and collection of the heated cooling water, which the latter benefits the cyclic utilization of the cooling water. Meanwhile, as the existing spray header has a good atomization effect on the cooling water, the heated water vapor comprises a large amount of cooling water absorbing heat insufficiently, which can condense into large water droplets on the water separator and then falls into the space so as to cool the containment again, achieving the purpose of improving the utilization of cooling water.

According to another embodiment of the present invention, the containment cooling apparatus further includes a gas tank disposed in the containment, wherein the gas tank is connected to an upper portion of the cooling water tank via a second communicating pipe, and the cooling water tank is a closed container. In such embodiment, the gas tank disposed in the containment is used to store gas. When the water in the primary circuit of the containment leaks, the internal temperature of the containment rises, causing the gas stored in the gas tank to expand. The expanding gas increases the internal pressure of the cooling water tank, and the increased internal pressure affects the cooling water, increasing the flow rate of the cooling water spraying from the spray header. Namely, the faster the temperature rises, the larger the cooling water flow rate is. Thus, the containment cooling apparatus has a strengthened cooling effect on the containment, that is to say the present cooling apparatus has higher cooling reliability.

In another embodiment, the cooling water tank is annular, and an axis of the cooling water tank is collinear with an axis of the shield to provide strong stability for supporting.

In some embodiments, a cooling water outlet is disposed on a bottom portion of the shield for timely discharging the overheated cooling water remaining in the space, enabling the containment cooling apparatus to have an effective cooling effect on the containment.

As the spray header comprises a large number of communicating pipes and nozzles, in some embodiments, the spray header is axisymmetrically disposed above the containment to cool the containment evenly as well as have a strong structural stability.

When in use, the temperature of the containment fluctuates slightly, resulting in a change of internal pressure in the gas tank, so that the cooling water stored in the cooling water tank can spray out in normal condition. In order to avoid the aforementioned situation, in some embodiments, the containment cooling apparatus further comprises a rupture disk disposed in the gas tank and/or the second communicating pipe, wherein the rupture disk is ruptured during an increase of pressure in the gas tank, and the rupture disk in an intact state is capable of isolating a space on both sides thereof. In such scheme, the rupture disk is preferably fixed in a pipe section detachable from the second communicating pipe. Meanwhile, the pipe section is located on the outside of the containment to conveniently replace the rupture disk or the overall assembly of the rupture disk and the pipe section. When the pressure applied on the side of the rupture disk adjacent to the gas tank increases to a certain extent, the rupture disk is ruptured. At the same time, the cooling water stored in the cooling water tank cools the containment.

In sum, the present invention has at least the following advantages and beneficial effects:

The cooling water tank stores the cooling water used as the containment coolant. The cooling water tank disposed above the containment allows the cooling water to flow into the spray header via the first communicating pipe under gravity, and then spray from the spray header to realize passive cooling of the containment. In such embodiment, the spray header is disposed in the space, resulting in sufficient contact between the cooling water and the outer wall of the containment, facilitating cooling effect on the containment and collection of the heated cooling water, which the latter benefits the cyclic utilization of the cooling water. Meanwhile, as the existing spray header has a good atomization effect on the cooling water, the heated water vapor comprises a large amount of cooling water absorbing heat insufficiently, which can condense into large water droplets on the water separator and then falls into the space so as to cool the containment again, achieving the purpose of improving the utilization of cooling water.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which:

The FIGURE is a cross-sectional view of the containment cooling apparatus according to an embodiment of the present invention.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

As shown in the FIGURE, a containment cooling apparatus includes a cooling water tank 3 disposed above a containment 1; a spray header 4 connected to the cooling water tank 3 via a first communicating pipe 5, wherein the spray header 4 is disposed on an outside of the containment 1 for spraying cooling water to an outer wall of the containment 1; a bell shaped shield 2 covering the containment 1, wherein the cooling water tank 3 is disposed on a top portion of the shield 2; a space 9 formed between an inner wall of the shield 2 and the outer wall of the containment 1, wherein the spray header 4 is disposed in the space 9; an exhaust hole 11 disposed on the top portion of the shield 2; and a water separator 12 disposed in the exhaust hole 11 and/or the space 9.

Specifically, the cooling water tank 3 stores the cooling water used as the containment coolant. The cooling water tank 3 disposed above the containment 1 allows the cooling water to flow into the spray header 4 via the first communicating pipe 5 under gravity, and then spray from the spray header 4 to realize passive cooling of the containment 1. In such embodiment, the spray header 4 is disposed in the space 9, resulting in sufficient contact between the cooling water and the outer wall of the containment 1, facilitating cooling effect on the containment 1 and collection of the heated cooling water, which the latter benefits the cyclic utilization of the cooling water. Meanwhile, as the existing spray header 4 has a good atomization effect on the cooling water, the heated water vapor comprises a large amount of cooling water absorbing heat insufficiently, which can condense into large water droplets on the water separator 12 and then falls into the space 9 so as to cool the containment 1 again, achieving the purpose of improving the utilization of cooling water.

Embodiment 2

As shown in the FIGURE, on the basis of Embodiment 1, the present embodiment further includes a gas tank 8 disposed in the containment 1, wherein the gas tank 8 is connected to an upper portion of the cooling water tank 3 via a second communicating pipe 6, and the cooling water tank 3 is a closed container. In such embodiment, the gas tank 8 disposed in the containment 1 is used to store gas. When the water in the primary circuit of the containment 1 leaks, the internal temperature of the containment 1 rises, causing the gas stored in the gas tank 8 to expand. The expanding gas increases the internal pressure of the cooling water tank 3, and the increased internal pressure affects the cooling water, increasing the flow rate of the cooling water spraying from the spray header 4. Namely, the faster the temperature rises, the larger the cooling water flow rate is. Thus, the containment cooling apparatus has a strengthened cooling effect on the containment 1, that is to say the present cooling apparatus has higher cooling reliability.

When in use, the temperature of the containment 1 fluctuates slightly, resulting in a change of internal pressure in the gas tank 8, so that the cooling water stored in the cooling water tank 3 can spray out in normal condition. In order to avoid the aforementioned situation, the containment cooling apparatus further comprises a rupture disk 7 disposed in the gas tank 8 and/or the second communicating pipe 6, wherein the rupture disk 7 is ruptured during an increase of pressure in the gas tank 8, and the rupture disk 7 in an intact state is capable of isolating a space on both sides thereof. In such scheme, the rupture disk 7 is preferably fixed in a pipe section detachable from the second communicating pipe 6. Meanwhile, the pipe section is located on the outside of the containment 1 to conveniently replace the rupture disk 7 or the overall assembly of the rupture disk 7 and the pipe section. When the pressure applied on the side of the rupture disk 7 adjacent to the gas tank 8 increases to a certain extent, the rupture disk 7 is ruptured. At the same time, the cooling water stored in the cooling water tank 3 cools the containment 1.

Embodiment 3

As shown in the FIGURE, on the basis of Embodiment 1, the cooling water tank 3 is annular, and an axis of the cooling water tank 3 is collinear with an axis of the shield 2 to provide strong stability for supporting. A cooling water outlet 10 is disposed on a bottom portion of the shield 2 for timely discharging the overheated cooling water remaining in the space 9, enabling the containment cooling apparatus to have an effective cooling effect on the containment 1. As the spray header 4 comprises a large number of communicating pipes and nozzles, the spray header 4 is axisymmetrically disposed above the containment 1 to cool the containment 1 evenly as well as have a strong structural stability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A containment cooling apparatus, comprising:
a cooling water tank disposed above a containment and containing cooling water therein;
a spray header connected to the cooling water tank via a first communicating pipe, wherein the spray header is disposed on an outside of the containment for spraying the cooling water to an outer wall of the containment;
a bell shaped shield covering the containment, wherein the cooling water tank is disposed on a top portion of the shield;
a space formed between an inner wall of the shield and the outer wall of the containment, wherein the spray header is disposed in the space;
an exhaust hole disposed on the top portion of the shield;
a water separator disposed in the exhaust hole and/or the space; and
a gas tank disposed in the containment, wherein the gas tank is connected to an upper portion of the cooling water tank via a second communicating pipe, and the cooling water tank is a closed container.

2. The containment cooling apparatus according to claim 1, wherein the cooling water tank is annular, and an axis of the cooling water tank is collinear with an axis of the shield.

3. The containment cooling apparatus according to claim 1, wherein a cooling water outlet is disposed on a bottom portion of the shield.

4. The containment cooling apparatus according to claim 1, wherein the spray header is axisymmetrically disposed above the containment.

5. The containment cooling apparatus according to claim 1, further comprising a rupture disk disposed in the gas tank and/or the second communicating pipe, wherein the rupture disk is ruptured during an increase of pressure in the gas tank, and the rupture disk in an intact state is capable of isolating a space on both sides thereof.

* * * * *